United States Patent
Kawamoto et al.

[11] Patent Number: 5,786,874
[45] Date of Patent: Jul. 28, 1998

[54] LIQUID CRYSTAL PROJECTOR WITH CONDENSER LENSES FOR BLUE AND GREEN PANELS ONLY OR THE RED PANEL CONDENSER LENS FOCAL LENGTH BEING LARGEST

[75] Inventors: Naoki Kawamoto; Masanori Kojima, both of Tokyo, Japan

[73] Assignee: Mitsubishi Denki Kabushiki Kaisha, Tokyo, Japan

[21] Appl. No.: 675,291

[22] Filed: Jul. 1, 1996

[30] Foreign Application Priority Data

Mar. 28, 1996 [JP] Japan ................. 8-074941

[51] Int. Cl.$^6$ ............................. G02F 1/1335
[52] U.S. Cl. ................................ 349/8
[58] Field of Search ........................ 349/8, 9

[56] References Cited

U.S. PATENT DOCUMENTS

| | | | |
|---|---|---|---|
| 4,796,978 | 1/1989 | Tanaka et al. | 349/9 |
| 5,060,058 | 10/1991 | Goldenberg et al. | 349/8 |
| 5,295,005 | 3/1994 | Nishida et al. | 349/8 |
| 5,488,436 | 1/1996 | Choi et al. | 349/8 |

FOREIGN PATENT DOCUMENTS

| | | | |
|---|---|---|---|
| 0343729 | 11/1989 | European Pat. Off. | |
| 3-067216 | 3/1991 | Japan | 349/8 |
| 3-146942 | 6/1991 | Japan | 349/8 |
| 6-222301 | 8/1994 | Japan | 349/8 |
| 6-222380 | 8/1994 | Japan | 349/8 |

*Primary Examiner*—Anita Pellman Gross

[57] ABSTRACT

On the incident sides of the blue light modulating liquid crystal panel and the green light modulating liquid crystal panel, condenser lenses whose outer diameter is equal to or more than that of the two liquid crystal panels are disposed respectively. No condenser lens is disposed on the incident side of the red light modulating liquid crystal panel. The focal length f of the two condenser lenses is preferably set to be a value of $$(L_1 \cdot L_2)/(L_1 + L_2),$$

where $L_1$ is the distance between each condenser lens and the light source, and $L_2$ is the distance between each condenser lens and the projection lens. The direct light from the discharge lamp and incident upon the condenser lenses is all incident upon the projection lens. Alternatively, a condenser lens may be disposed on the incident side of the red light modulating liquid crystal, but having a focal length which is longer than the other condenser lenses, preferably equal to $L_1$. Therefore, an image on a screen is improved in illuminance difference between the central portion and the peripheral portion and at the same time, luminance balance of the three single color lights is improved and color shade is reduced.

9 Claims, 6 Drawing Sheets

$(L_1 \cdot L_2)/(L_1+L_2) \leq f \leq L_1$

LIQUID CRYSTAL PROJECTOR WITH CONDENSER LENSES FOR BLUE AND GREEN PANELS ONLY OR THE RED PANEL CONDENSER LENS FOCAL LENGTH BEING LARGEST

BACKGROUND OF THE INVENTION

1. Field of the Invention

The present invention relates to a liquid crystal projector using a liquid crystal panel as an optical modulator.

2. Description of The Related Art

FIG. 1 is a schematic diagram showing a configuration of a conventional liquid crystal projector. In FIG. 1, reference numeral 31 designates a discharge lamp. As the discharge lamp 31, a metal halide lamp in which, for example, mixture of high pressure mercury steam and metallic halogenide are sealed is used. In the discharge lamp 31, a pair of electrodes 31a, 31a are disposed oppositely. The discharge lamp 31 emits light by generating an arc due to high pressure discharge between the two electrodes 31a, 31a. The discharge lamp 31 is disposed at practically the position of the focal point of a reflector 32 which is formed at the curvature of a parabola or an ellipse, and the light directly from the discharge lamp 31 and the light reflected by the reflector 32 are radiated as white light 51 to the direction opposite to the reflector 32.

In an optical path of the white light 51, a blue passing/magenta reflecting mirror 33 is disposed obliquely at a predetermined distance from the discharge lamp 31. Blue light 52 in the white light 51 passes through the blue passing/magenta reflecting mirror 33 and goes straight ahead. In the optical path of the blue light 52, a reflecting mirror 34 is disposed in parallel with the blue passing/magenta reflecting mirror 33 and the blue light 52 is reflected at a right angle by the reflecting mirror 34. In the optical path of the blue light 52 reflected by the reflecting mirror 34, a blue light modulating liquid crystal panel 38B, a blue passing/magenta reflecting mirror 44, a cyan passing/red reflecting mirror 45 and a projection lens 36 are disposed in this order, and the blue light 52 is modulated to blue image component by the blue light modulating liquid crystal panel 38B.

On the other hand, magenta light 53 in the white light 51 is reflected at a right angle by the blue passing/magenta reflecting mirror 33. In an optical path of the magenta light 53, a red passing/cyan reflecting mirror 35 and a reflecting mirror 36 are disposed in parallel with the afore-mentioned blue passing/magenta reflecting mirror 44 and cyan passing/red reflecting mirror 45 respectively. Between the red passing/cyan reflecting mirror 35 and the blue passing/magenta reflecting mirror 44, a green light modulating liquid crystal panel 38G is disposed, and between the reflecting mirror 36 and the cyan passing/red reflecting mirror 45, a red light modulating liquid crystal panel 38R is disposed. Green light 54 in the magenta light 53 is reflected at a right angle by the red passing/cyan reflecting mirror 35 and modulated to green image component by the green light modulating liquid crystal panel 38G, then reflected at a right angle by the blue passing/magenta reflecting mirror 44 and composed with the blue light which is modulated by the blue light modulating liquid crystal panel 38B.

Red light 55 passed through the red passing/cyan reflecting mirror 35 is reflected at a right angle by the reflecting mirror 36 and modulated to red image component by the red light modulating liquid crystal panel 38R, then reflected at a right angle by the cyan passing/red reflecting mirror 45 and composed with cyan composed by the blue passing/magenta reflecting mirror 44. Image light 57 of blue, green and red composed through optical paths of the same length are magnified by the projection lens 36 and projected on a screen 47.

But a conventional liquid crystal projector having such a configuration have problems as follows.

FIG. 2 is a schematic diagram showing optical paths of direct light from the discharge lamp 31 and reflect light by the reflector 32. In FIG. 2, broken lines and dashed lines show optical paths of direct light from the discharge lamp 31 and solid lines show optical path of reflect light by the reflector 32. The reflector 32 is formed at such a curvature as to condense the reflected light at the liquid crystal panel 38, so that the reflected light passed through the liquid crystal panel 38 is projected at the center of image by the projection lens 36. On the other hand, direct light from the discharge lamp 31 within a predetermined diffuse angle is incident upon the projection lens 36, as shown by the dashed line, and projected by the projection lens 36. But, as shown by the broken line, since the direct light outside the range of the predetermined diffuse angle is not incident upon the projection lens 36, it does not contribute to a projected image. Therefore, there is a problem that the central portion of the projected image is bright and the peripheral portion thereof is dark.

In such circumstances, a liquid projector has been developed which increases illuminance of the peripheral portion of a projected image by disposing a condenser lens at each incident side of the blue light modulating liquid crystal panel, green light modulating liquid crystal panel, and red light modulating liquid crystal panel so that quantity of direct light incident upon the edge portion of the projection lens from the discharge lamp is increased.

However, in the aforementioned conventional liquid crystal projector, there was a problem that color shade is generated in a projected image.

FIG. 3 is a schematic front cross-sectional view showing an arc in a discharge lamp. As shown in FIG. 3, since the arc has a high temperature at a central portion C thereof and has a low temperature at a peripheral portion A thereof, the light of the central portion C is white and that of the peripheral portion A is red. In the way, light emitted from a light source has color shade, and the color shade causes the peripheral portion of a projected image to be red.

SUMMARY OF THE INVENTION

The present invention has been developed in such circumstances and the object thereof is to provide a liquid crystal projector in which a condenser lens for condensing light is disposed only at incident side of each liquid crystal panel for blue light and liquid crystal panel for green light so that illuminance of blue light and green light is increased at the peripheral portion of an image and illuminance difference of an image is improved and at the same time color shade is decreased.

Another object of the invention is to provide a liquid crystal projector which increases illuminance of blue light and green light more than that of red light at the peripheral portion of an image, improves illuminance difference of an image and decreases color shade at the same time by disposing a condenser lens at each incident side of the liquid crystal panels for red light, green light and blue light so that the focal length of the condenser lens disposed at the incident side of the liquid crystal panel for red light is set to be a value larger than that of the focal length of the other condenser lens.

The first aspect of the liquid crystal projector of the invention is provided with a unit for separating light from a light source, which emits light whose peripheral portion is red more than the central portion, into a plurality of single color light of red, green and blue, three liquid crystal panels for modulating respective single color light, a condenser lens which is disposed only at the incident side of the liquid crystal panel for blue light and condenses blue light, a condenser lens which is disposed only at the incident side of the liquid crystal panel for green light and condenses green light, means for composing lights modulated by the respective liquid crystal panels, and a projection lens which projects the obtained composed light. In other words, a condenser lens is not provided at the incident side of the liquid crystal panel for red light.

The second aspect of the liquid crystal projector of the invention is that, the focal length f of the two condenser lenses in the first aspect is set to be a value within a range of $$(L_1 \cdot L_2)/(L_1 + L_2) \leq f \leq L_1,$$

where $L_1$ is the distance between each condenser lens and the light source and $L_2$ is the distance between each condenser lens and the projection lens.

The third aspect of the liquid crystal projector of the invention is provided with a unit for separating light from a light source, which emits light whose peripheral portion is red more than central portion, into a plurality of single color light of red, green and blue, three liquid crystal panels for modulating respective single color light, condenser lenses which are disposed at the respective incident sides of the liquid crystal panel and condense the corresponding single color light, a unit for composing light modulated by the respective liquid crystal panels, and a projection lens which projects the obtained composed light, in which the focal length of a condenser lens disposed at the incident side of the liquid crystal panel for red light is set to be a value larger than that of a focal distance of a condenser lens disposed at the incident side of the liquid crystal panels for blue light and green light.

The fourth aspect of the liquid crystal of the invention is that, the focal length f of the condenser lenses disposed at the incident sides of the liquid crystal panels for blue light and green light in the third aspect is set to be a value within a range of $(L_1 \cdot L_2)/(L_1 + L_2) \leq f \leq L_1$, where $L_1$ is the distance between each condenser lens and the light source and $L_2$ is the distance between each condenser lens and the projection lens.

In the following, explanation will be made on the principle of the invention referring to a schematic diagram of FIG. 4. In the FIG. 4, a discharge lamp 1 is disposed almost at the focal point of a reflector 2 formed at a curvature of a parabola or an ellipse and at the opposite side of the reflector 2. Viewed from the discharge lamp 1, a condenser lens 7, a blue light modulating or green light modulating liquid crystal panel 8, and a projection lens 16 are disposed in this order. The light emitted from the discharge lamp 1 is radiated omnidirectionally, and almost half of the light is reflected by the reflector 2, as shown by solid line, and is incident upon the projection lens 16 after passing through the condenser lens 7 and the liquid crystal panel 8.

Among the direct light from the discharge lamp 1, as shown by broken line, a part of the light spread at a predetermined angle toward the liquid crystal panel 8 reaches the condenser lens 7 disposed at the incident side of the liquid crystal panel 8. At this time, since the focal length f of the condenser lens 7 is set to be a value within a range of $(L_1 \cdot L_2)/(L_1 + L_2) \leq f \leq L_1$, where $L_1$ is a distance between each condenser lens and the light source and $L_2$ is the distance between each condenser lens and the projection lens, the direct light incident upon the edge portion of the condenser lens 7 at an acute angle is incident upon the projection lens 16 from the condenser lens 7. Therefore the peripheral portion of an image projected by the projection lens 16 becomes bright. In addition, when the focal length f is $(L_1 \cdot L_2)/(L_1 + L_2)$, the peripheral portion of an image becomes brightest.

On the other hand, in the first aspect, since the condenser lens is not disposed at the incident side of the red light modulating liquid crystal panel, illuminance at the peripheral portion of the projected image is low when compared with that in the central portion, however, illuminance at the peripheral portion is higher than that at the peripheral portion of an image due to blue light or green light in case of no condenser lens according to color shade emitted by the discharge lamp. Since illuminance of the peripheral portion of an image to which blue light and green light are projected is heightened by the condenser lens, as mentioned above, luminance balance of three single color lights is improved and color shade of an image is decreased.

On the other hand, in the third aspect, by disposing a condenser lens whose focal length is longer than that of the aforementioned condenser lens 7, quantity of red light incident upon the edge portion of the project lens is increased. However, in case of such a focal length, it is possible to brighten the peripheral portion of an image still more with less quantity of blue light or green light of the case where a condenser lens is disposed as aforementioned and to reduce color shade at the same time. The focal length of a condenser lens disposed at the incident side of the red light modulating liquid crystal penal is set to be such a value as to reduce color shade corresponding to the degree of color shade of the light emitted by the discharge lamp 1 and illuminance of blue light and green light of the edge portion of an image. Thereby, corresponding to the degree of color shade of the light emitted by the light source, it is possible to reduce color shade of an image properly.

The above and further objects and features of the invention will more fully be apparent from the following detailed description with accompanying drawings.

DESCRIPTION OF THE PREFERRED EMBODIMENTS

Figure 1:
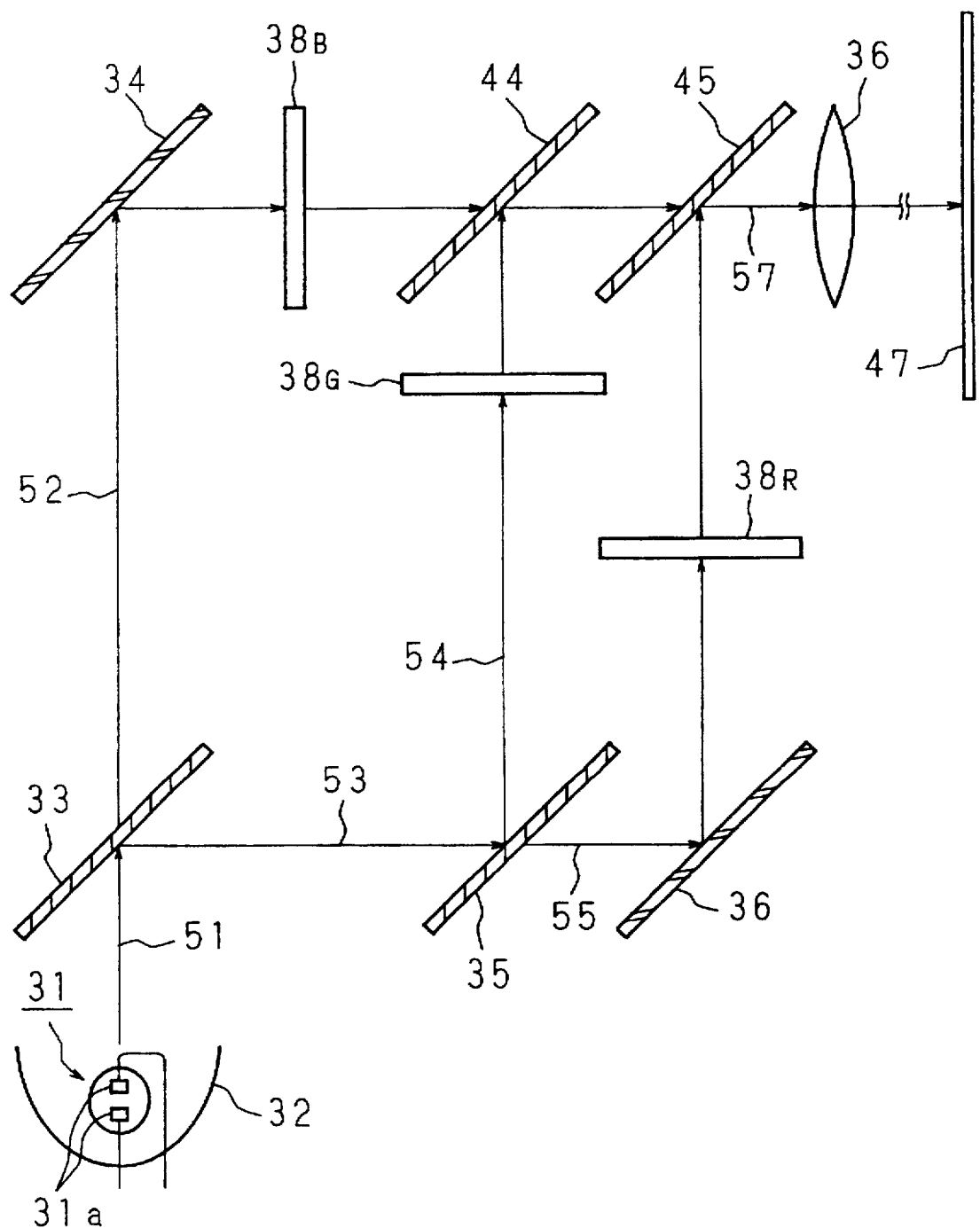
FIG. 1 is a schematic diagram showing a configuration of a conventional liquid crystal projector.
Figure 2:
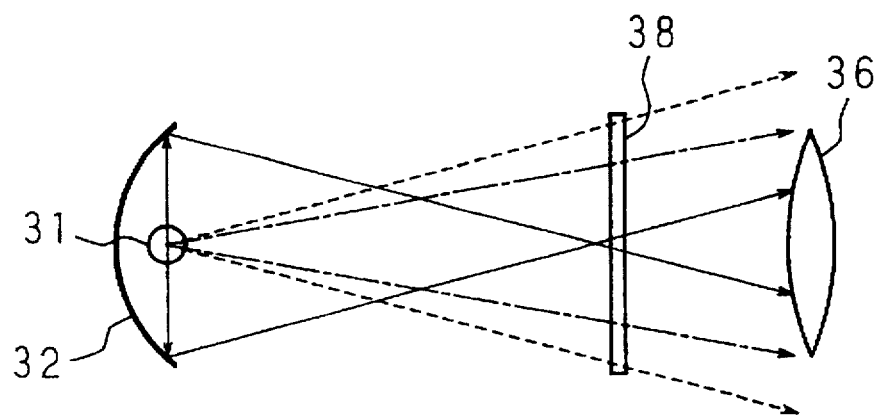
FIG. 2 is a schematic diagram showing optical paths of the direct light emitted from the discharge lamp and the reflected light by the reflector.
Figure 3:
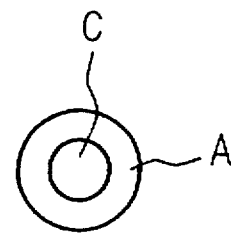
FIG. 3 is a schematic front cross-sectional view showing an arc in the discharge lamp.
Figure 4:
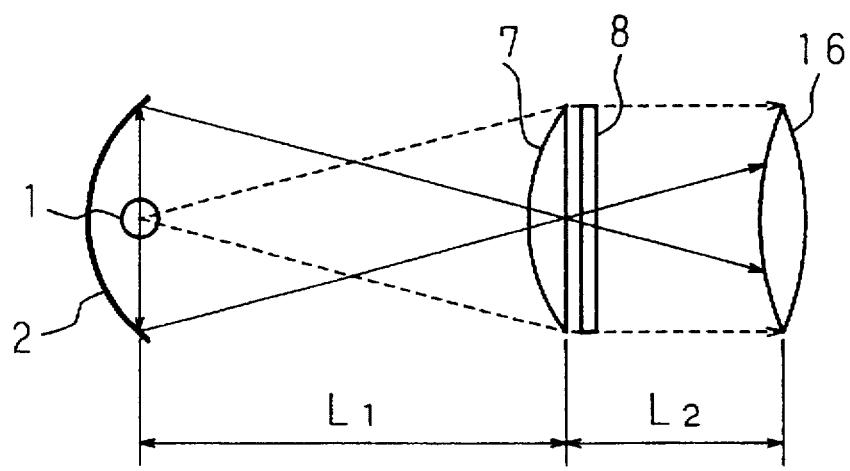
FIG. 4 is an explanatory view explaining principle of the invention.

In the following, concrete explanation will be made on an embodiment of the invention referring to drawings thereof. In addition to the description of the principles of the present invention above in the summary regarding FIG. 4, explanation will be made on the first and second aspects of a liquid crystal projector of the invention.

Figure 5:
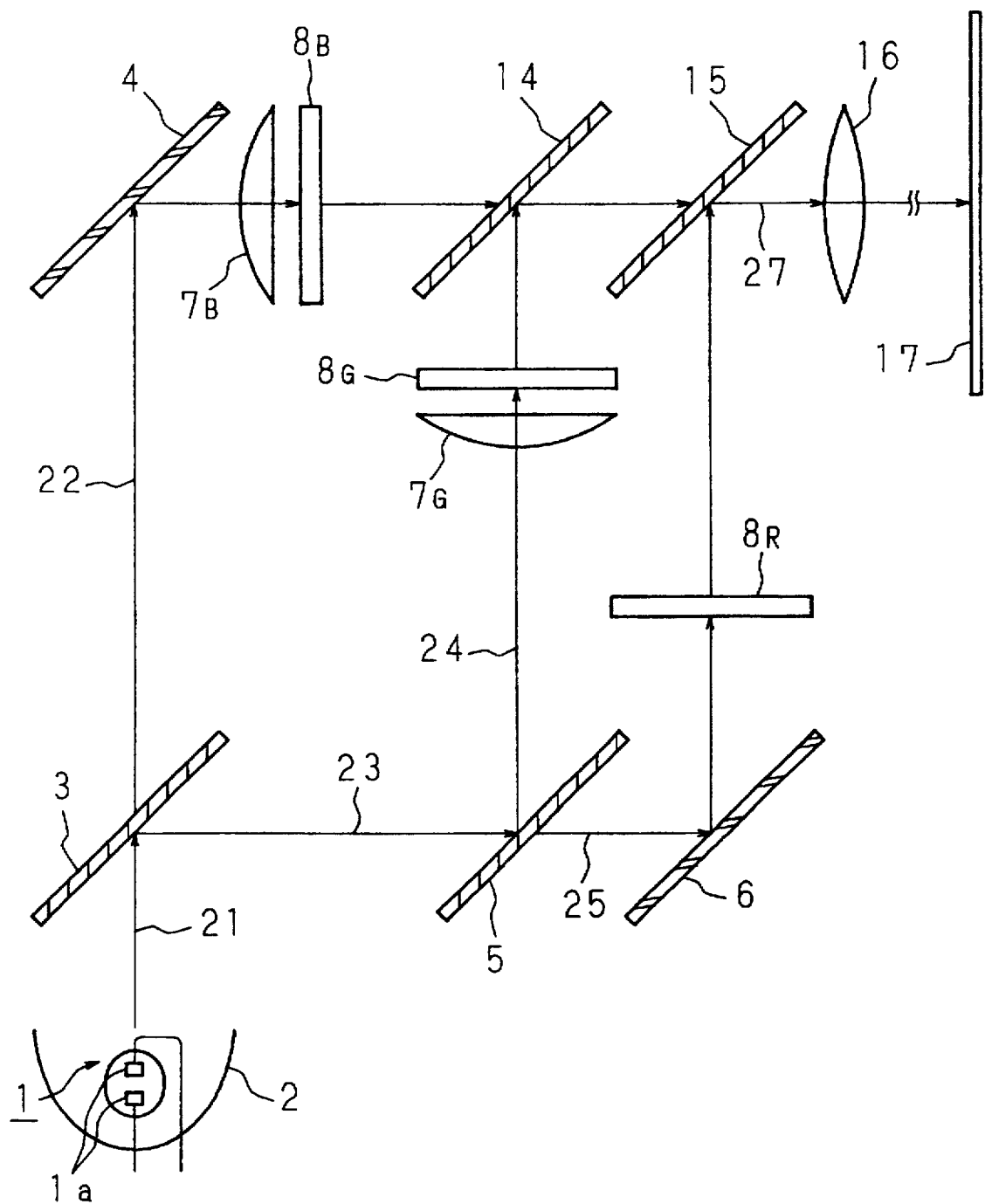
FIG. 5 is a schematic diagram showing a configuration of a liquid crystal projector related to the invention.

FIG. 5 is a schematic diagram showing a configuration of a liquid crystal projector related to the invention. In FIG. 5, a discharge lamp 1 includes a pair of electrodes 1a, 1a are disposed oppositely. The discharge lamp 1 emits light by generating an arc due to high pressure discharge between electrodes 1a, 1a. The discharge lamp 1 is disposed almost at the focal point of a reflector 2 formed at a curvature of a parabola or an ellipse, and the direct light from the discharge lamp 1 and the reflected light by the reflector 2 are radiated as white light 21 to the direction opposite to the reflector 2.

In the optical path of the white light 21, a blue passing/ magenta reflecting mirror 3 is disposed obliquely at a predetermined distance from the discharge lamp 1, and blue light 22 in the white light 21 passes through the blue passing/magenta reflecting mirror 3 and goes straight ahead. In the optical path of the blue light 22, a reflecting mirror 4 is disposed in parallel with the blue passing/magenta reflecting mirror 3. The blue light 22 is reflected at a right angle by the reflecting mirror 4. In the optical path of the blue light 22 reflected by the reflecting mirror 4, a blue light modulating liquid crystal panel 8B, a blue passing/magenta reflecting mirror 14, a cyan passing/red reflecting mirror 15, and a projection lens 16 are disposed in this order, and the blue light 22 incident upon the blue light modulating liquid crystal panel 8B is modulated to blue image component there.

On the other hand, magenta light 23 in the white light 21 is reflected at a right angle by the blue passing/magenta reflecting mirror 3. In the optical path of magenta light 23, a red passing/cyan reflecting mirror 5, and reflects cyan and a reflecting mirror 6 are disposed in parallel with the aforementioned mirror 14 and mirror 15 respectively. Between the red passing/cyan reflecting mirror 5 and the blue passing/magenta reflecting mirror 14, a green light modulating liquid crystal panel is disposed, and between the reflecting mirror 6 and the cyan passing/red reflecting mirror 15, a red light modulating liquid crystal panel 8R is disposed. Green light 24 in the magenta light 23 is reflected at a right angle by the red passing/cyan reflecting mirror 5 and modulated to green image component by the green light modulating liquid crystal panel 8G, then reflected at a right angle by the blue passing/magenta reflecting mirror 14 and composed with the blue light modulated by the blue light modulating liquid crystal panel 8B.

Red light 25 passed through the red passing/cyan reflecting mirror 5 is reflected at a right angle by the reflecting mirror 6 and modulated to red image component by the red light modulating liquid crystal panel 8R, then reflected at a right angle by the cyan passing/red reflecting mirror 15, and composed with cyan composed by the blue passing/magenta reflecting mirror 14. In this way, image light 27 of blue, green and red composed after passing through the optical paths of the same length is magnified by the projection lens 16 and projected on the screen 17.

On the incident sides of the aforementioned blue light modulating liquid crystal panel 8B and the green light modulating liquid crystal panel 8G, condenser lenses 7B and 7G whose diameters are almost the same or more than that of the two liquid crystal panels 8B and 8G are disposed respectively, and on the incident side of the red light modulating liquid crystal panel 8R, no condenser lens is disposed. The focal length f of the two condenser lenses 7B and 7G is set to be $(L_1 \cdot L_2)/(L_1+L_2)$, where $L_1$ is the distance between each condenser lens and the light source and $L_2$ is the distance between each condenser lens and the projection lens. Thereby, the direct light incident upon the condenser lenses 7B and 7G from the discharge lamp 1 is all incident upon the projection lens 16. Therefore, an image on the screen 16 is improved in illuminance difference between the central portion and the peripheral portion.

On the other hand, on the incident side of the red light modulating liquid crystal panel 8R, a condenser lens is not disposed. Therefore, illuminance at the peripheral portion of an image on the screen 16 is lower than that of the central portion, however, illuminance of the peripheral portion is higher than that of an image due to blue light or green light of the case of no condenser lenses 7B and 7G, according to color shade of the light emitted by the discharge lamp 1. But since illuminance at the peripheral portion of an image to which blue light and green light are projected is heightened by the condenser lenses 7B and 7G as mentioned above, illuminance balance of three color lights is improved and color shade is reduced. In addition, the improvement of color shade by the condenser lenses 7B and 7G has effect within the range of $f=L_1$ as for the focal length f. Accordingly, the focal length f of the condenser lenses 7B and 7G should be determined corresponding to the degree of color shade of the light emitted by the discharge lamp 1.

Next, explanation will be made on the third aspect and fourth aspect of the liquid crystal projector of the invention referring to a schematic diagram of FIG. 6 of the invention. Different from an example shown in FIG. 5, a condenser lens 7R is disposed also on the incident side of the red light modulating liquid crystal panel 8R. In addition, in FIG. 6, the parts corresponding to those in FIG. 5 have the same numerals and explanation thereof will be omitted.

Figure 6:
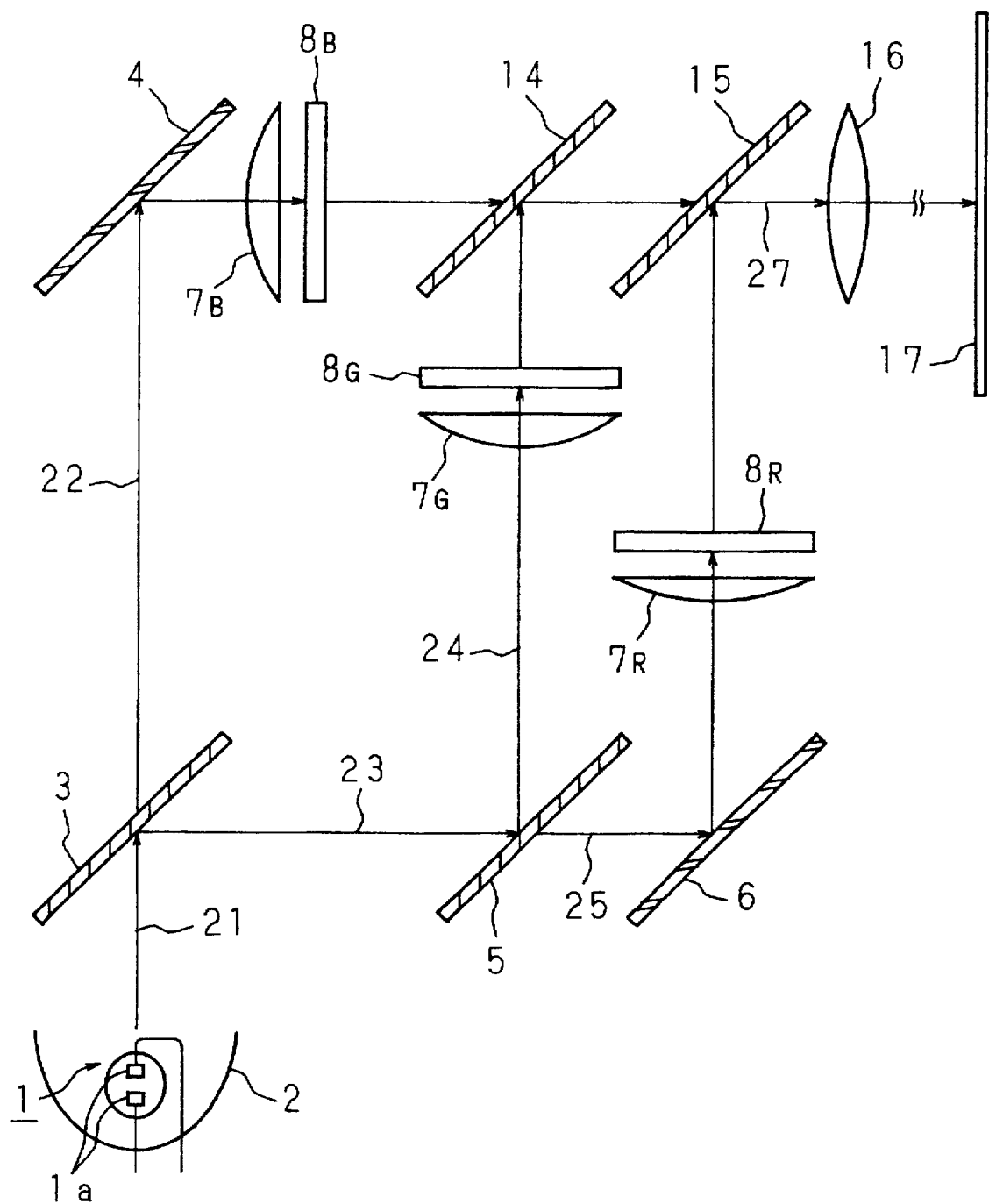
FIG. 6 is a schematic diagram showing an embodiment of another invention.

As shown in FIG. 6, on the incident side of the red light modulating liquid crystal panel 8R, a condenser lens 7R is disposed whose focal length is longer as compared with those of the condenser lens 7B disposed on the incident side of the blue light modulating liquid crystal panel 8B, and the condenser lens 7G disposed at the incident side of the green light modulating liquid crystal panel 8G. Concretely, when the focal length of the condenser lenses 7B and 7G is $(L_1 \cdot L_2)/(L_1+L_2)$, the focal length of the condenser lens 7R is set to be $L_1$.

By adopting such a configuration, quantity of red light incident upon the edge portion of the projection lens 16 is made smaller than the quantity of blue light condensed by the condenser lens 7B or the quantity of green light condensed by the condenser lens 7G. As a result, color shade of an image is reduced and at the same time, illuminance of the peripheral portion of an image is increased more and illuminance nonuniformity is improved.

As described above, according to the first aspect and the second aspect of the liquid crystal projector of the invention, by disposing condenser lenses only on the incident sides of the liquid crystal panel for blue light and the liquid crystal panel for green light, and not by disposing a condenser lens on the incident side of the liquid crystal panel for red light, illuminance difference of an image and color shade are improved, and the quality of an image is improved as a result. And, since the number of condenser lenses to be disposed is small, the cost is restricted.

And, according to the third aspect and the fourth aspect of the liquid crystal projector of the invention, a condenser lens is disposed also on the incident side of the liquid crystal panel for red light. According to the focal length of the condenser lens disposed on the incident side of the liquid crystal panel for red light, reducing quantity of the red light incident upon the edge portion of the projection lens is adjustable, therefore, color shade of an image can be reduced properly corresponding to the degree of color shade of light emitted from the light source.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalents of such meets and bounds thereof are therefore intended to be embraced by the claims.

What is claimed is:

1. A liquid crystal projector, comprising:

a light source which emits light redder at the peripheral portion than at the central portion;

separating means for separating light emitted by said light source into single color lights of red, green and blue;

a liquid crystal panel for red light which modulates the red light separated by said separating means;

a liquid crystal panel for green light which modulates the green light separated by said separating means;

a liquid crystal panel for blue light which modulates the blue light separated by said separating means;

a condenser lens for green light which is disposed at incident side of said liquid crystal panel for green light, and condenses the green light separated by said separating means;

a condenser lens for blue light which is disposed at incident side of said liquid crystal panel for blue light, condenses the blue light separated by said separating means;

composing means for composing the light modulated by each of said liquid crystal panel; and a projection lens which projects the light composed by said composing means, wherein said liquid crystal panel for red light receives the red light separated by said separating means without the red light traversing a condenser lens.

2. The liquid crystal projector as set forth in claim 1, wherein the focal length f of said condenser lens for green light and said condenser lens for blue light is set to be a value within a range of $$(L_1 \cdot L_2)/(L_1+L_2) \leq f \leq L_1,$$

where $L_1$ is the distance between each condenser lens and the light source and $L_2$ is the distance between each condenser lens and the projection lens.

3. A liquid crystal projector, comprising:

a light source which emits light redder at the peripheral portion than at the central portion:

separating means for separating light emitted by said light source into single color lights of red, green and blue:

a liquid crystal panel for red light which modulates the red light separated by said separating means:

a liquid crystal panel for green light which modulates the green light separated by said separating means:

a liquid crystal panel for blue light which modulates the blue light separated by said separating means:

a condenser lens for red light which is disposed on the incident side of said liquid crystal panel for red light, and condenses the red light separated by said separating means:

a condenser lens for green light which is disposed on the incident side of said liquid crystal panel for green light, and condenses the green light separated by said separating means:

a condenser lens for blue light which is disposed on the incident side of said liquid crystal panel for blue light, and condenses the blue light separated by said separating means:

composing means for composing the lights modulated by each of said liquid crystal panel: and a projection lens which projects the light composed by said composing means:

wherein the focal length of a condenser lens disposed on the incident side of said liquid crystal panel for red light is set to be a value larger than a value of the focal length of a condenser lens disposed on the incident side of said liquid crystal panel for blue light and of the focal length of a condenser lens disposed on the incident side of said liquid crystal panel for green light.

4. The liquid crystal projector as set forth in claim 3, wherein the focal length f of said condenser lens for green light and said condenser lens for blue light is set to be a value within a range of $$(L_1 \cdot L_2)/(L_1+L_2) \leq f \leq L_1,$$

where $L_1$ is the distance between each condenser lens and the light source and $L_2$ is the distance between each condenser lens and the projection lens.

5. The liquid crystal projector as set forth in claim 4, wherein the focal length of said condenser lens for red light is set to be $L_1$.

6. A method for projecting light from a light source which emits light redder at the peripheral portion than at the central portion onto a display comprising the steps of:

separating light emitted by the light source into single color lights of red, green and blue;

condensing green light output by said separating step;

condensing blue light output by said separating step;

modulating red light separated output by said separating step, without condensing the red light;

modulating condensed green light output by said step of condensing green light;

modulating condensed blue light output by said step of condensing blue light;

composing modulated light output by each of said modulating steps; and projecting composed light output by said composing step.

7. A method for projecting light from a light source which emits light redder at the peripheral portion than at the central portion onto a display comprising the steps of:

separating light emitted by said light source into single color lights of red, green and blue:

condensing green light output by said separating step via a first condenser lens;

condensing blue light output by said separating step via a second condenser lens;

condensing red light output by said separating step via a third condenser lens, including setting a focal length of the third condenser lens to be a value larger than a focal length of the first condenser lens and a focal length of the second condenser lens;

modulating condensed red light output by said step of condensing red light;

modulating condensed green light output by said step of condensing green light;

modulating condensed blue light output by said step of condensing blue light;

composing modulated light output by each of said modulating steps; and projecting composed light output by said composing step.

8. The method as set forth in claim 7, further comprising setting the focal length f of the first and second condenser lenses to be a value within a range of $$(L_1 \cdot L_2)/(L_1+L_2) \leq f \leq L_1,$$

where $L_1$ is the distance between each condenser lens and the light source and $L_2$ is the distance between each condenser lens and the projection lens.

9. The method as set forth in claim 8, further comprising setting the focal length of the third condenser lens to $L_1$.

* * * * *